Jan. 23, 1923.

J. INGELLS.
DIRIGIBLE HEADLIGHT.
FILED APR. 15, 1922.

Inventor
J. Ingells
By D. Swift
Attorney

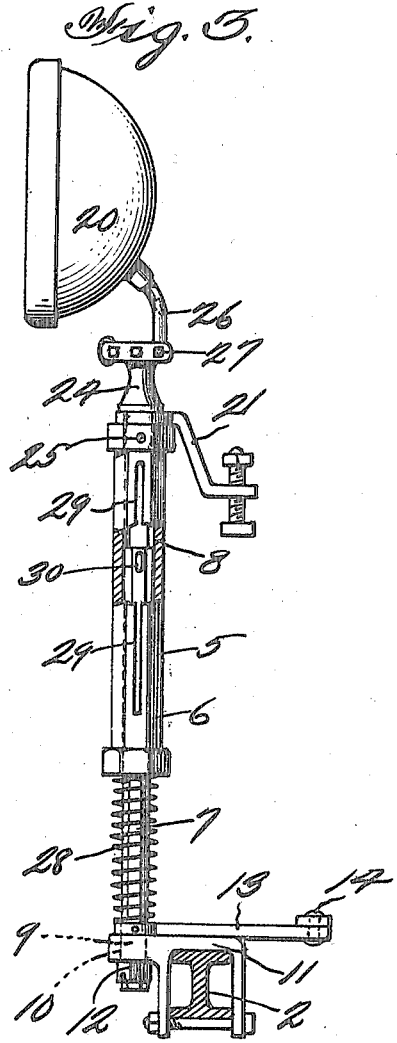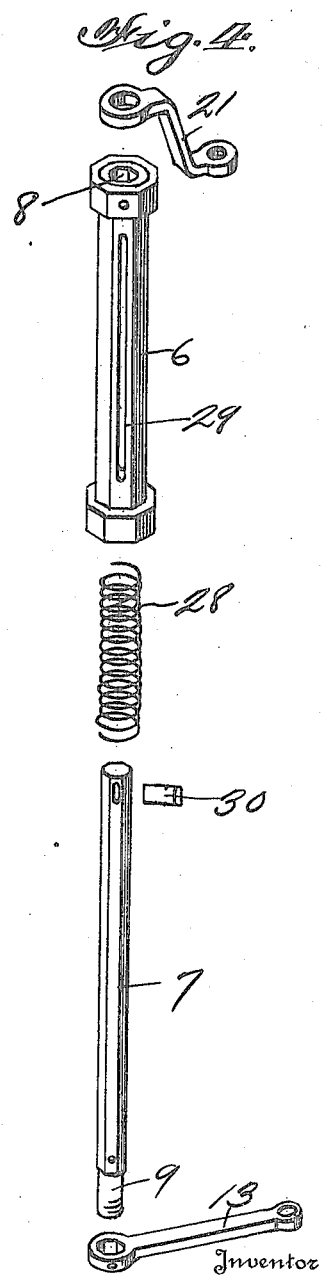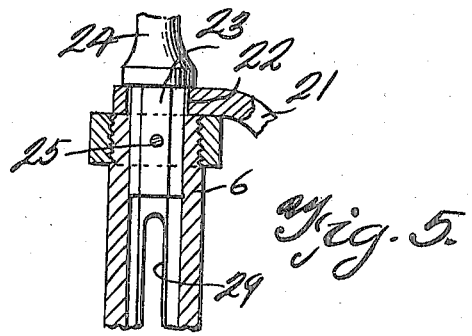

Patented Jan. 23, 1923.

1,442,950

UNITED STATES PATENT OFFICE.

JAMES INGELLS, OF MUSKEGON, MICHIGAN.

DIRIGIBLE HEADLIGHT.

Application filed April 15, 1922. Serial No. 553,219.

*To all whom it may concern:*

Be it known that I, JAMES INGELLS, a citizen of the United States, residing at Muskegon, in the county of Muskegon, State of Michigan, have invented a new and useful Dirigible Headlight; and I do hereby declare the following to be a full, clear, and exact description of the invention, such as will enable others skilled in the art to which it appertains to make and use the same.

The invention relates to dirigible headlights and has for its object to provide a device of this character which is operated by one of the steering arms of one of the steering knuckles through lever connections with a pivoted vertically disposed standard which carries the light. Also to provide a standard formed from telescopically engaged members, which members are interengaged in such a manner that they may slide inwardly and out-relatively with each other but will rotate together, thereby allowing flexing of the vehicle springs of the front axle.

A further object is to provide a spring for normally forcing the telescopically engaging members apart thereby insuring a positive operation and at the same time prevent rattling of the parts.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 3 is a side elevation of the headlight mechanism showing the axle of the vehicle in section and parts broken away to better show the structure.

Figure 4 is a collective detail perspective view of the various parts of the mechanism, showing the same in position for assembling.

Figure 5 is a detail sectional view through the upper end of one of the telescopical members, showing a portion of the light bracket in elevation.

Figure 1:
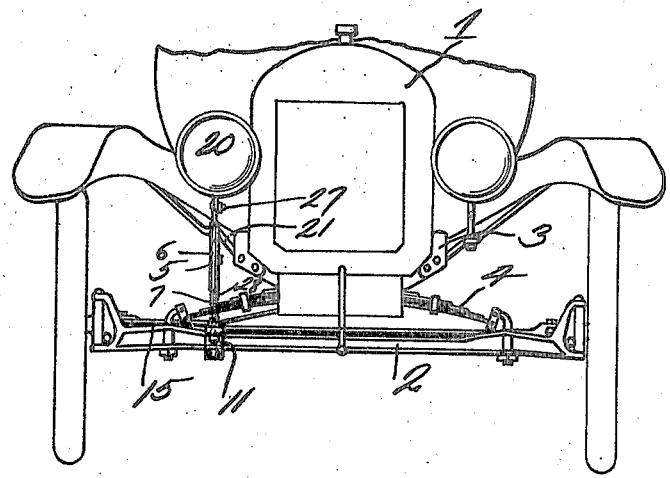
Figure 1 is a front elevation of a conventional form of automobile, showing the dirigible headlight mechanism applied thereto.
Figure 2:
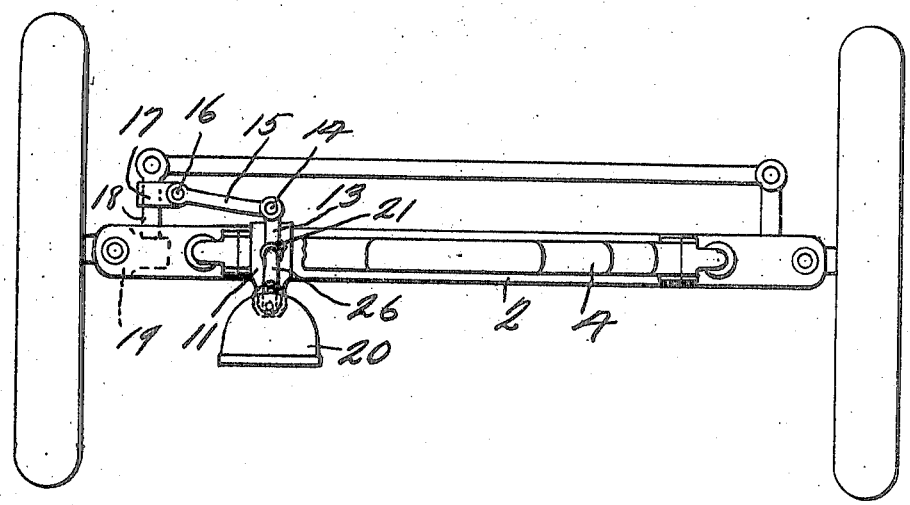
Figure 2 is a top plan view of the front running gear of the automobile, showing the dirigible headlight mechanism in top plan.

Referring to the drawings, the numeral 1 designates a conventional form of automobile and 2 the axle thereof. The frame 3 of the automobile is supported above the axle by means of the spring 4, therefore it will be seen that during the movement of the automobile over the ground the distance between the axle and the frame 3 will vary, consequently the vertically disposed pivoted standard 5 is formed in two sections 6 and 7. The section 7 is preferably hexagonally shaped in cross section and is slidably mounted in the similarly shaped chamber 8 of the sleeve section 5, therefore it will be seen that during the flexing of the spring 4, the sections 6 and 7 will slide in relation to each other to accommodate the flexing action and the movement of the axle 2. The hexagonally shaped section 7 has its lower end 9 cylindrically shaped and rotatably mounted in a bearing 10 of a bracket 11 carried by the axle 2 and is held from upward displacement by means of a nut 12. Secured to the section 7 above the bracket 11 is a rearwardly extending arm 13. Pivotally connected at 14 to the rearwardly extending arm 13 is a connecting rod 15, which connecting rod is pivotally connected at 16 to a member 17 carried by the arm 18 steering knuckle 19. It will be seen that when the vehicle wheels are turned from one side to the other during the steering of the automobile, that the lamp 20, which is supported on the vertically disposed standard 5 will be moved in the direction of movement of the vehicle wheel, thereby causing the light, from the lamp which is moved, to be reflected on the road bed ahead of the vehicle especially in making turns and consequently allowing the operator to clearly see the road bed during the turning operation. Extending outwardly from the frame 3 of the automobile is the bracket 21, which bracket overlies the upper end of the standard section 6 and is provided with an aperture 22 in which downwardly extending hexagonally shaped portion of the lamp supporting post is rotatably mounted, said portion 23 extending into the section 6 of the standard and is secured thereto by means of the pin 25.

The lamp 20 is provided with an arm 26, which is secured to the post 24 by means of a bolt 27 and may be adjusted in a vertical plane in such a manner that the light will be reflected on the road bed close to the vehicle or at a distance forwardly thereof. Interposed between the lower end of the standard section 6 and the arm 13 is a coiled spring 28, which spring normally forces the sections 6 and 7 in opposite directions, thereby preventing rattling of the parts and insuring a positive telescoping action. The opposite sides of the standard section 6 are provided with slots 29 which slots receive the ends of a guide member 30 extending through the upper end of the standard section 7, thereby additionally guiding the parts in their telescopical movement and preventing binding of the parts. The device has been shown applied to one automobile light, however it is to be understood that both lights may be operated in the same manner if so desired.

From the above it will be seen that a dirigible headlight mechanism is provided which is simple in construction, positive in its operation and the parts reduced to a minimum, thereby allowing the device to be cheaply constructed and quickly manufactured.

The invention having been set forth what is claimed as new and useful is:—

The combination with a steering knuckle arm, an axle and the body of an automobile, of a dirigible headlight mechanism for said automobile, said mechanism comprising a vertically disposed standard, said standard being formed from telescopically engaged sections, said standard being rotatably mounted in bearings of brackets carried by the body and by the axle, the body carried bracket engaging the upper end of the standard and having an aperture registering with a chamber in the upper section of the standard, a lamp carrying bracket extending through the aperture of the body carried bracket and into the chamber of the upper standard section, spring means for normally forcing the sections apart, a rearwardly extending arm carried by the lower standard section and a connecting rod connecting the rearwardly extending arm to the steering knuckle arm.

In testimony whereof I have signed my name to this specification in the presence of two subscribing witnesses.

JAMES INGELLS.

Witnesses:
   HENRIETTA COOPER,
   HAZEL C. LAUGLEY.